(12) United States Patent  
Asher

(10) Patent No.: US 7,945,618 B2  
(45) Date of Patent: May 17, 2011

(54) PEER-TO-PEER SERVICE DESIGNER

(76) Inventor: Oren Asher, Thornhill (CA)

( * ) Notice: Subject to any disclaimer, the term of this patent is extended or adjusted under 35 U.S.C. 154(b) by 0 days.

(21) Appl. No.: 10/360,334

(22) Filed: Feb. 10, 2003

(65) Prior Publication Data

US 2004/0205168 A1 Oct. 14, 2004

(51) Int. Cl.  
*G06F 15/16* (2006.01)

(52) U.S. Cl. ..................................................... 709/204

(58) Field of Classification Search .................. 709/204, 709/206, 225, 205  
See application file for complete search history.

(56) References Cited

U.S. PATENT DOCUMENTS

| | | | |
|---|---|---|---|
| 6,016,478 A * | 1/2000 | Zhang et al. .................. 705/9 |
| 6,151,621 A * | 11/2000 | Colyer et al. ................ 709/204 |
| 6,256,663 B1 * | 7/2001 | Davis ........................... 709/204 |
| 6,332,154 B2 * | 12/2001 | Beck et al. .................... 709/204 |
| 6,519,629 B2 * | 2/2003 | Harvey et al. ................ 709/204 |
| 6,584,493 B1 * | 6/2003 | Butler .......................... 709/204 |
| 6,789,117 B1 * | 9/2004 | Joiner et al. ................. 709/224 |
| 2003/0105812 A1 * | 6/2003 | Flowers et al. .............. 709/203 |

OTHER PUBLICATIONS

Microsoft Corporation. Microsoft Windows XP Help Files. Released Oct. 25, 2001.*

* cited by examiner

*Primary Examiner* — William C Vaughn, Jr.  
*Assistant Examiner* — Scott Christensen  
(74) *Attorney, Agent, or Firm* — Alex Porat

(57) ABSTRACT

A peer-to-peer communication system, including a service manager for managing peer-to-peer services, a zone manager for managing zones, each zone including at least one peer-to-peer service and a window display layout therefor, and a privacy manager for restricting access to a zone, to a select group of users. A method is also described and claimed.

12 Claims, 7 Drawing Sheets

PEER-TO-PEER SERVICE DESIGNER

FIELD OF THE INVENTION

The present invention relates to peer-to-peer computing.

BACKGROUND OF THE INVENTION

Peer-to-peer computing enables users to share computing resources and content, and to communicate with one other directly. Familiar peer-to-peer services today are NetMeeting® of Microsoft Corporation (Redmond, Wash.), and Napster® of Napster, Inc. (Redwood City, Calif.). NetMeeting is used for text, voice and video chat between two users, and Napster is used for sharing music files.

Peer-to-peer computing eliminates the need to upload content and communicate through a central host web server, thereby saving time, effort and expense. Especially with the proliferation of mobile computing devices, such as PDAs, cell-phones, peer-to-peer computing is becoming more and more prevalent, and more and more of a modus operandus.

However, at its early stage of adoption today, peer-to-peer computing suffers from (i) lack of an integrated development tool for building a variety of peer-to-peer services within a single application; (ii) lack of flexibility in managing multiple peer-to-peer services, each service intended for a different community of users; (iii) lack of privacy; and (iv) lack of richness in imagery.

SUMMARY OF THE INVENTION

The present invention provides a method and system for designing and deploying peer-to-peer services. The present invention introduces the concept of a "zone," which is customizable to include one or more peer-to-peer services, and which can be shared with designated users. A zone corresponds to a virtual space in which a community of users can chat, share photo albums, exchange files, send private e-mail, play games, participate in a video conference, and otherwise communicate within a private, secure and controlled environment.

The present invention provides an integrated design and deployment tool that supports an unlimited variety of peer-to-peer services within a single architecture. The present invention overcomes many disadvantages of central server architectures, whereby services are directed through one or more host computers.

The present invention also provides a novel photo sharing service, whereby a user can share digital photo albums with a group of other users, without the need to upload them to a host web server, or to send them as e-mail attachments. The other users can interactively view photos within the shared albums, enjoying the full resolution of the photos regardless of how many megapixels they include.

There is thus provided in accordance with a preferred embodiment of the present invention a peer-to-peer communication system, including a service manager for managing peer-to-peer services, a zone manager for managing zones, each zone including at least one peer-to-peer service and a window display layout therefor, and a privacy manager for restricting access to a zone, to a select group of users.

There is additionally provided in accordance with a preferred embodiment of the present invention a peer-to-peer communication system, including a zone builder for defining a zone including at least one peer-to-peer service and a window display layout therefor, and a privacy manager for restricting access to a zone, to a select group of users.

There is further provided in accordance with a preferred embodiment of the present invention a peer-to-peer communication system, including a user manager for managing users and groups of users, and for identifying users who are currently on-line, a zone manager for managing zones belonging to users, each zone including at least one peer-to-peer service and a window display layout therefor, a zone navigator for identifying a zone belonging to a user who is on-line, and a service activator for activating the at least one peer-to-peer service included within the identified zone, and for displaying the at least one peer-to-peer service according to the window layout therefor.

There is yet further provided in accordance with a preferred embodiment of the present invention a peer-to-peer communication system, including a user manager for managing users and groups of users, and for identifying users who are currently on-line, a zone manager for managing zones belonging to users, each zone including at least one peer-to-peer service and a window display layout therefor, a privacy manager for restricting access to a zone, to a select group of users, and a zone navigator for identifying zones accessible to a given user, and belonging to users who are currently on-line.

There is moreover provided in accordance with a preferred embodiment of the present invention a peer-to-peer communication system, including a user manager for managing users and groups of users, and for identifying users who are currently on-line, a zone manager for managing zones belonging to users, each zone including at least one peer-to-peer service and a window display layout therefor, a privacy manager for restricting access to a zone, to a select group of users, and a zone navigator for identifying zones accessible to a given user, and belonging to users who are currently on-line.

There is additionally provided in accordance with a preferred embodiment of the present invention a peer-to-peer communication system, including a service manager for managing peer-to-peer services, a zone builder for defining a zone including at least one peer-to-peer service and a window display layout therefor, and a zone activator for activating the at least one peer-to-peer service within a zone, and for displaying the at least one peer-to-peer service according to the window layout therefor.

There is further provided in accordance with a preferred embodiment of the present invention a method for peer-to-peer communication, including identifying a user who is currently on-line, identifying a zone belonging to the user who is currently on-line, the zone including at least one peer-to-peer service and a window display layout therefor, activating the at least one peer-to-peer service within the identified zone, and displaying the at least one peer-to-peer service according to the window layout therefor.

There is yet further provided in accordance with a preferred embodiment of the present invention a method for peer-to-peer communication, including selecting at least one peer-to-peer service, generating a zone including the selected at least one peer-to-peer service and a window display layout therefor, activating the at least one peer-to-peer service within the identified zone, and displaying the at least one peer-to-peer service according to the window layout therefor.

There is moreover provided in accordance with a preferred embodiment of the present invention a method for peer-to-peer communication, including selecting at least one peer-to-peer service, generating a zone including the selected at least one peer-to-peer service and a window display layout therefor, selecting at least one user, and restricting access to the generated zone, to the at least one user.

There is additionally provided in accordance with a preferred embodiment of the present invention a method for peer-to-peer communication, including managing a plurality of users, associating to each individual user, a group of users from among the plurality of users, designated as friends of the individual user, further associating to each individual user, at least one zone belonging to the individual user, each such zone including at least one peer-to-peer service and a window display layout therefor, and associating to each zone belonging to each individual user, a group of users from among the friends of the individual user, entitled to access the zone.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention concerns peer-to-peer services for communities of users. Such services include inter alia chat services, file sharing and photo sharing services, and video conferencing services. In a preferred embodiment, a user of the present invention selects other users of the present invention with whom he wishes to participate, such other users being referred to herein as the user's "friends." Whenever one of the two mutual friends is using the present invention on-line, he is notified when the other friend is also on-line, and is able to include the other friend in services he generates.

Specifically, the present invention enables a user to create one or more "zones," a zone denoting one or more peer-to-peer services laid out graphically within a container window. For example, a zone may include a photo-sharing service, for sharing designated digital photo albums, and a file sharing service for exchanging designated files. Zones can be designed arbitrarily, and represent a customized "space" wherein participating users can communicate and share information. Thus it may be appreciated that associated with each user of the present invention is his group of "friends," and his one or more zones.

In accordance with a preferred embodiment of the present invention, for each zone of his, a user may designate which other users can have access to the zone. Thus a user may restrict access to a zone to one or more specific users, to members of his family, to a special interest group, or to such other group of users of the present invention. For example, a user may create a first zone for sharing home photos with members of his family, and a second zone for sharing files with colleagues, and a third zone for chatting with fellow football fans. It may thus be appreciated that the present invention provides for an unlimited variety of zones for different sharing scenarios.

Figure 1:
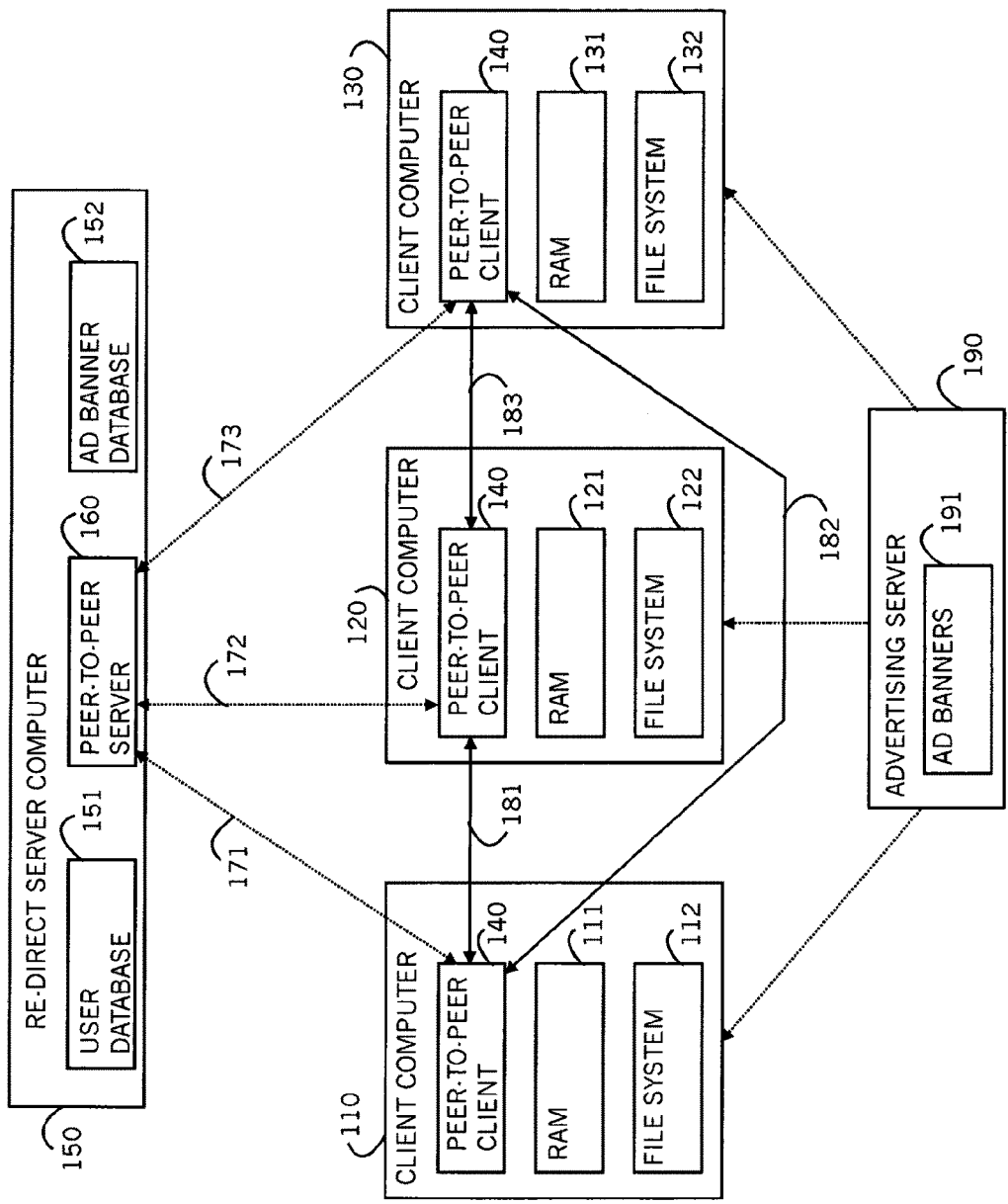
FIG. 1 is a simplified block diagram of a peer-to-peer designer, in accordance with a preferred embodiment of the present invention.

Reference is now made to FIG. 1, which is a simplified block diagram of a peer-to-peer designer, in accordance with a preferred embodiment of the present invention. Shown in FIG. 1 are client computers 110, 120 and 130, including respective volatile random access memories 111, 121 and 131, and respective permanent memories 112, 122 and 132 storing respective local file systems. Each client computer includes peer-to-peer client software 140, in accordance with a preferred embodiment of the present invention.

Also shown in FIG. 1 is a re-direct server computer 150, including two databases—a user database 151 and an ad banner database 152. Re-direct server computer includes peer-to-peer server software 160. In accordance with a preferred embodiment of the present invention, user database 151 maintains identifying information about each authorized user of the system of the present invention, and includes an IP address for each such user. For a user with dynamically generated IP addresses, user database 151 preferably is updated each time such user logs on to the system.

When client computer is connected to the Internet, and a user of client computer 110 runs client software 140, client computer 110 initially communicates with re-direct server computer 150 along network communication lines designated generically by 171, and logs on to the system, for example, by entering a userID and corresponding password. Based on user database 151, peer-to-peer server software 160 authenticates the user, identifies his client computer's IP address, updates user database 151 accordingly as necessary, and proceeds to re-direct client computer 110 so that it communicates directly with client computers 120 and 130 of friends of the user who are on-line, along network communication lines designated generically by 181 and 182.

Also shown in FIG. 1 is an advertising server 190 including a permanent memory 191 storing advertising banners. In accordance with a preferred embodiment of the present invention, peer-to-peer client software 140 streams advertising banners within its user interface display, based on an ad banner URL. Such ad banner URL is updated from time to time by peer-to-peer server software 160, based on ad banner database 152. It may thus be appreciated by those skilled in the art that ad banners may be targeted to specific groups of users as appropriate.

It may be appreciated that client computers 110, 120 and 130, re-direct server computer 150 and advertising server computer 190 include several standard components not illustrated in FIG. 1, including inter alia central processors, device drivers, communication hardware and software, RAM within re-direct server computer 150 and advertising server computer 190, and peripheral devices for input/output and display. For the sake of clarity in describing the present invention, only a small set of components are included in FIG. 1.

Figure 2:
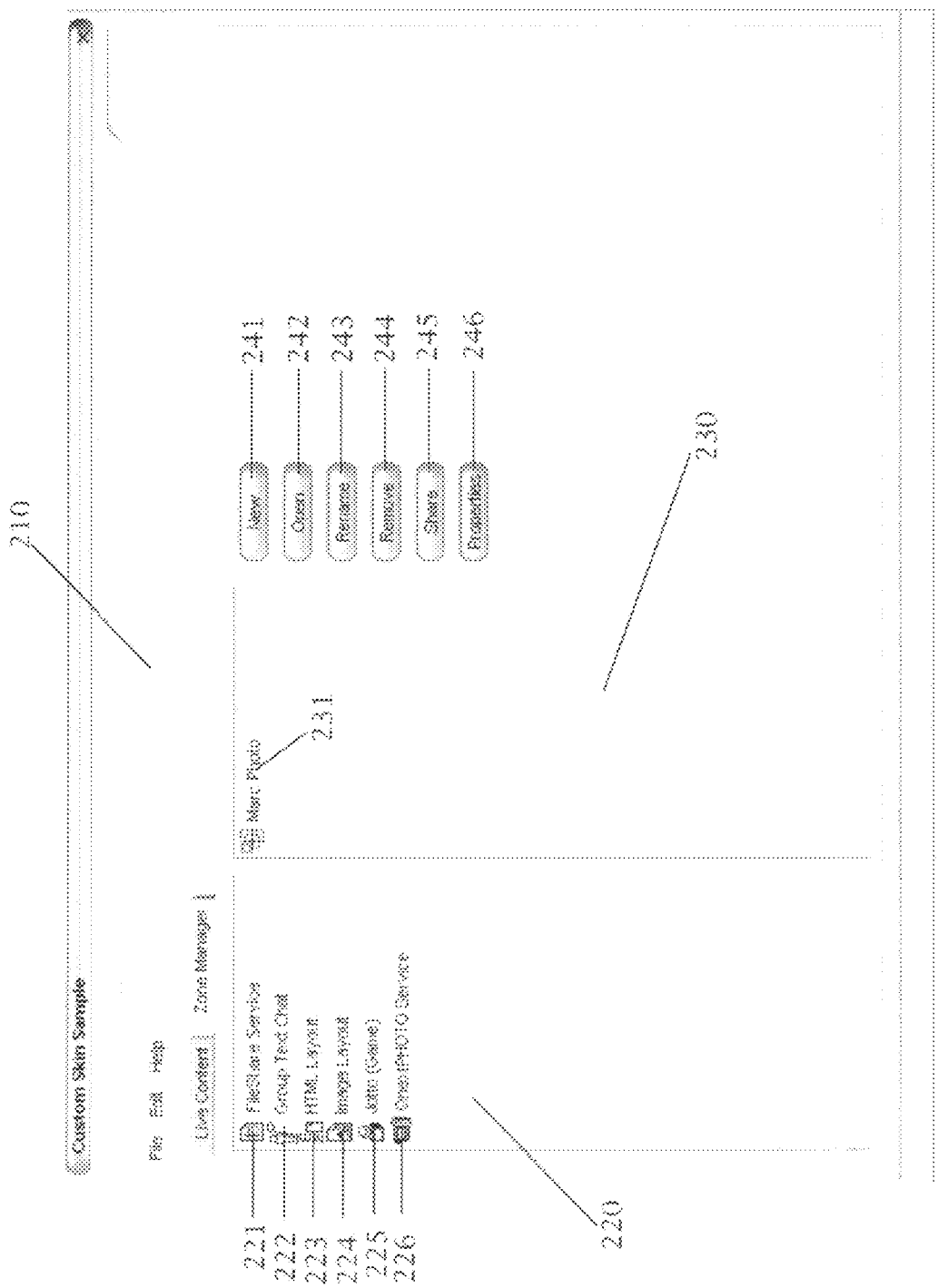
FIG. 2 is an illustration of an interface for enabling a user to design peer-to-peer zones, in accordance with a preferred embodiment of the present invention.

Reference is now made to FIG. 2, which is an illustration of an interface for enabling a user to design peer-to-peer zones, in accordance with a preferred embodiment of the present invention. Shown in FIG. 2 is a user interface window 210 including a left pane 220 displaying a list of peer-to-peer services, and including a right pane 230 displaying a list of existing zones belonging to the user.

As can be seen in FIG. 2, pane 220 includes a peer-to-peer file sharing service 221, a peer-to-peer group text chat service 222, an HTML layout service 223, an image layout service 224, a Jotto game service 225, and a photo service 226. When the user creates a new zone, one or more peer-to-peer services listed in pane 220 may be inserted into the zone, and positioned and sized at will. As can also be seen in FIG. 2, pane 230 displays one existing zone 231 belonging to the user.

Shown At the right of window 210 are a button control 241 for creating a new zone, a button control 242 for opening an existing zone, a button control 243 for renaming an existing zone, a button control 244 for removing a control, a button 245 for designating with which users an existing zone is to be shared, and a button 246 for setting properties of a existing zone.

Figure 3:
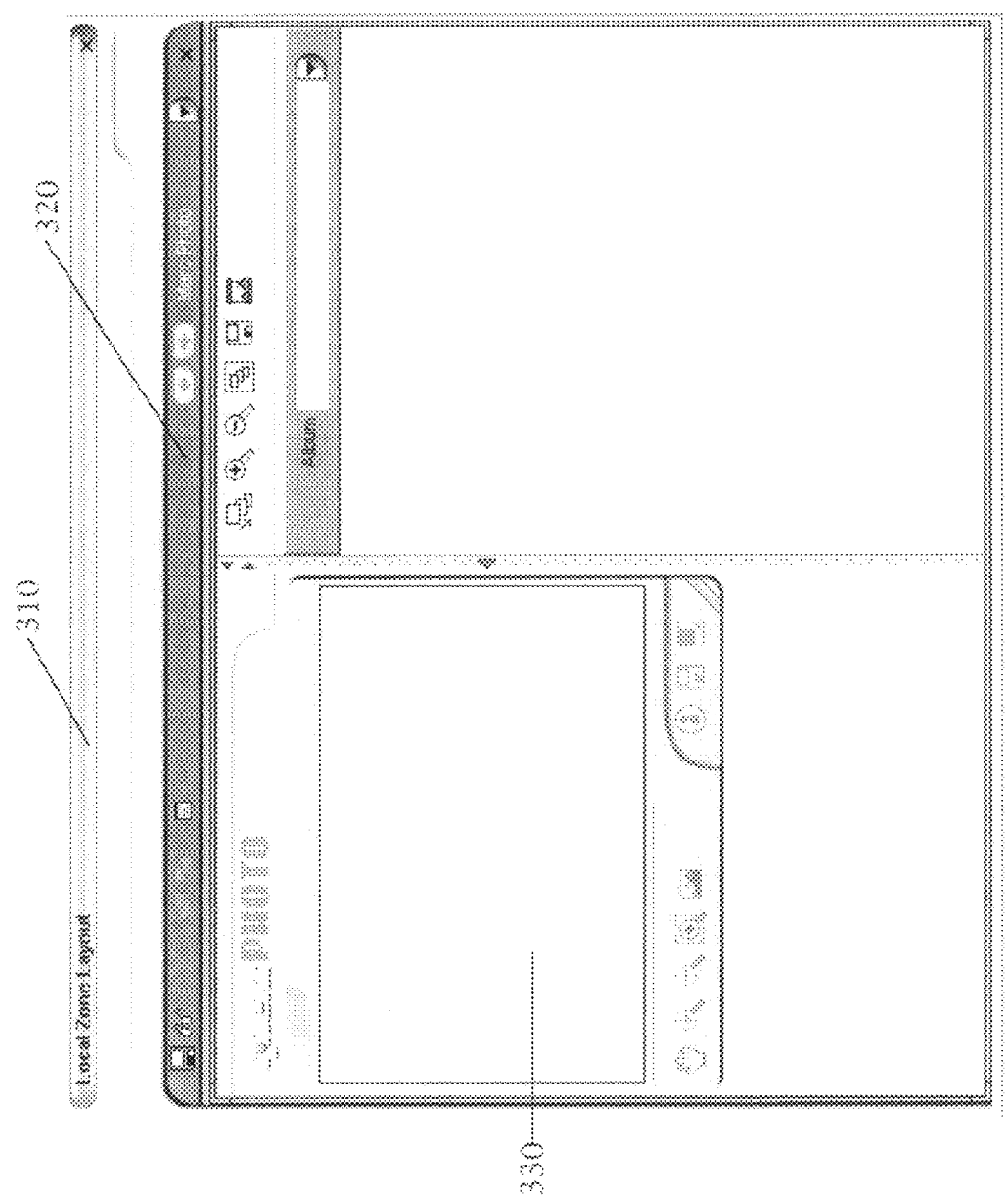
FIG. 3 is an illustration of a window including a zone designed by a user, in accordance with a preferred embodiment of the present invention.

Reference is now made to FIG. 3, which is an illustration of a window 310 including a zone 320 designed by a user, in accordance with a preferred embodiment of the present invention. Zone 320 may correspond to the user's zone 231 (FIG. 2). Preferably, window 310 is displayed in response to creation of a new zone or modification of an existing zone, for example, in response to a user clicking on control button 241 or control button 242 (FIG. 2).

As shown in FIG. 3, zone 320 includes a peer-to-peer photo sharing service 330. In accordance with a preferred embodiment of the present invention, peer-to-peer photo sharing service 330 is included within zone 320 by dragging photo service 226 service from within pane 220 and dropping it into the zone 320 display area. After being inserted, peer-to-peer photo sharing service 330 can be positioned and sized within zone 320 at will, using standard Windows positioning and sizing functionalities.

Figure 4:
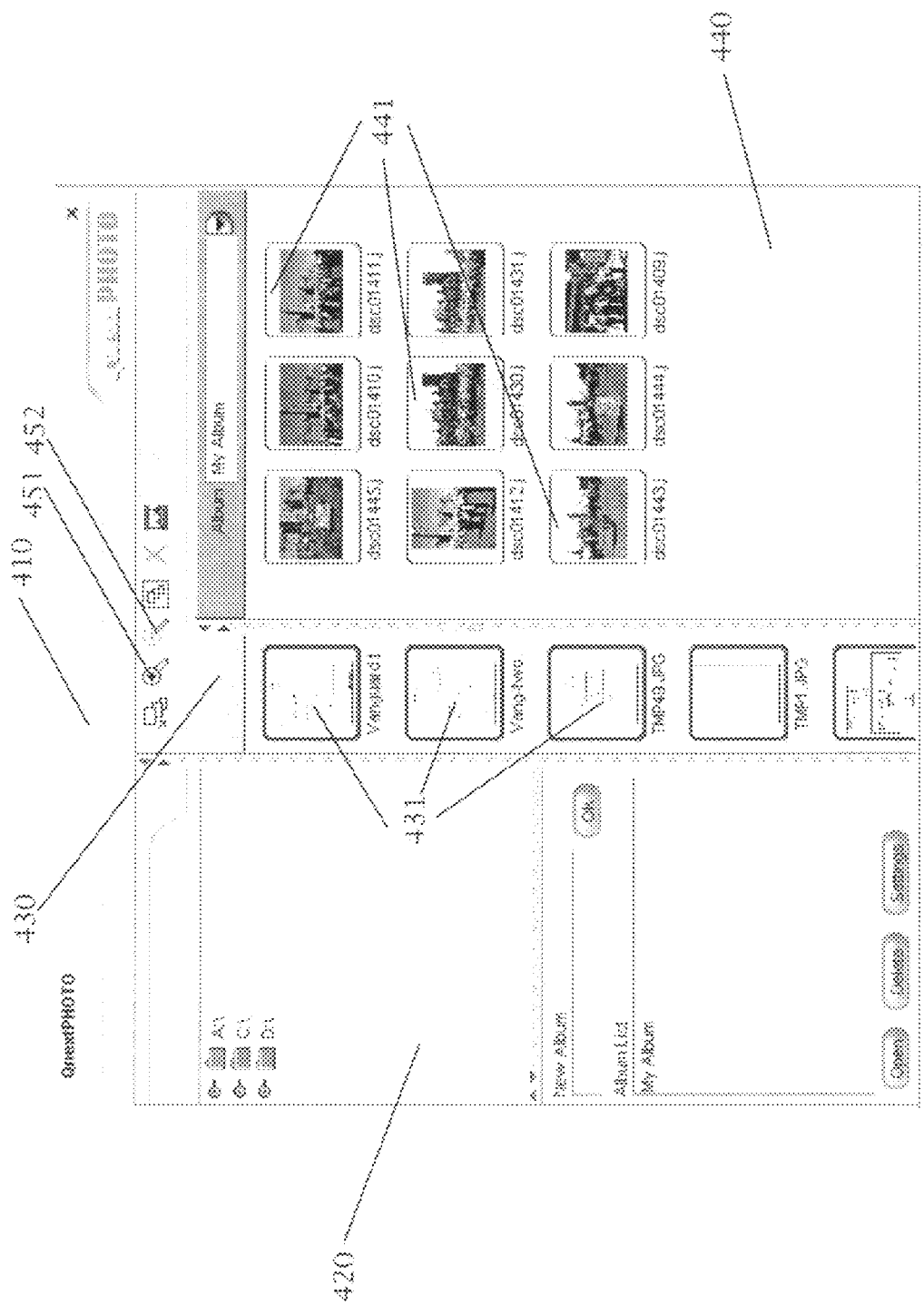
FIG. 4 is an illustration of a user interface display for creating a digital photo album, for sharing within a peer-to-peer photo sharing service, in accordance with a preferred embodiment of the present invention.

Reference is now made to FIG. 4, which is an illustration of a user interface display for creating a digital photo album, for sharing within peer-to-peer photo sharing service 330 (FIG. 3), in accordance with a preferred embodiment of the present invention. Shown in FIG. 4 is a window 410 including a left pane 420, with an explorer-type directory browser for selecting a directory within client computer file system 112 (FIG. 1). Preferably, window 410 is displayed in response to setting properties for a zone, for example, in response to a user clicking on control button 246 (FIG. 2).

Also show in FIG. 4 is a middle pane 430, displaying small representations of images (referred to herein as "thumbnails") within a directory selected in pane 420, and a right pane 440, displaying thumbnails of images included within a designated user photo album. Individual thumbnails in pane 430 are designated generically by 431, and individual thumbnails within pane 440 are designated generically by 441. Each thumbnail represents an image file within file system 112, and preferably corresponds to a low resolution version of the image it represents. Preferably, thumbnails can be enlarged and reduced at will, in response to a user clicking on control icons 451 and 452, respectively. Preferably, thumbnails from pane 430 are dragged and dropped into the right pane 440, for inclusion within a photo album named "My Album." Thumbnails of images from several directories can be dropped into pane 440, collectively generating a photo album to be shared through photo service 330.

In accordance with a preferred embodiment of the present invention, a data structure for a photo album includes links to the various image files, rather than copies of the image files themselves, thus obviating the need to use significant amounts of additional memory within client computer 110. It may thus be appreciated that the present invention overcomes disadvantages of conventional photo sharing by uploading photos to a host server computer.

Figure 5:
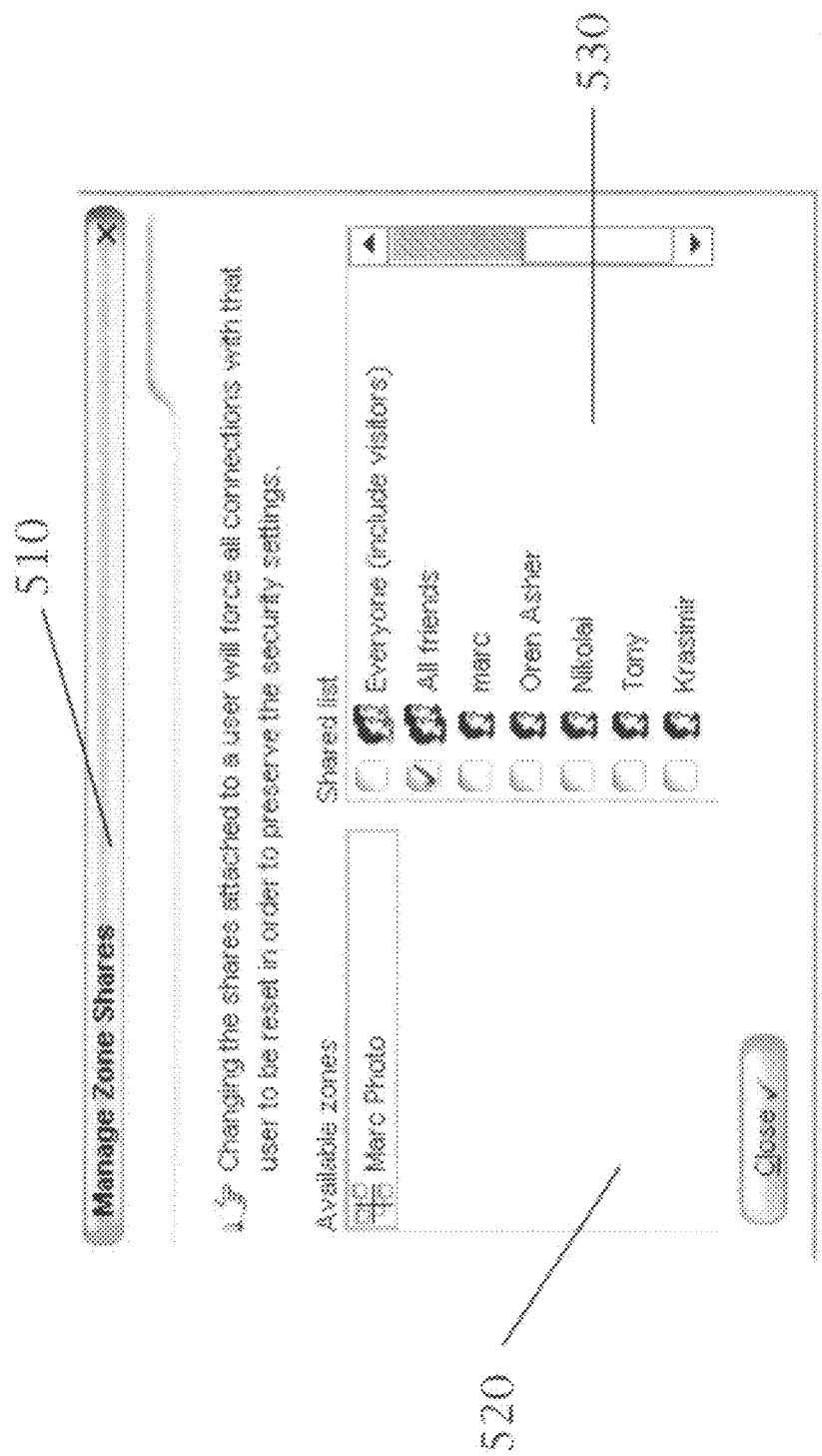
FIG. 5 is an illustration of a user interface window for restricting access to a zone to designated users, in accordance with a preferred embodiment of the present invention.

Reference is now made to FIG. 5, which is an illustration of a user interface window 510 for restricting access to zone 320 (FIG. 3) to designated users, in accordance with a preferred embodiment of the present invention. Preferably, window 510 is displayed in response to designating access for a zone, for example, in response to a user clicking on control button 245 (FIG. 2). As shown in FIG. 5, window 510 includes a left pane 520 displaying a list of zones belonging to a user, and a right pane 530 displaying a list of users of the system of the present invention. As shown in FIG. 5, access to zone 231 can be restricted to a designated group of users.

Figure 6:
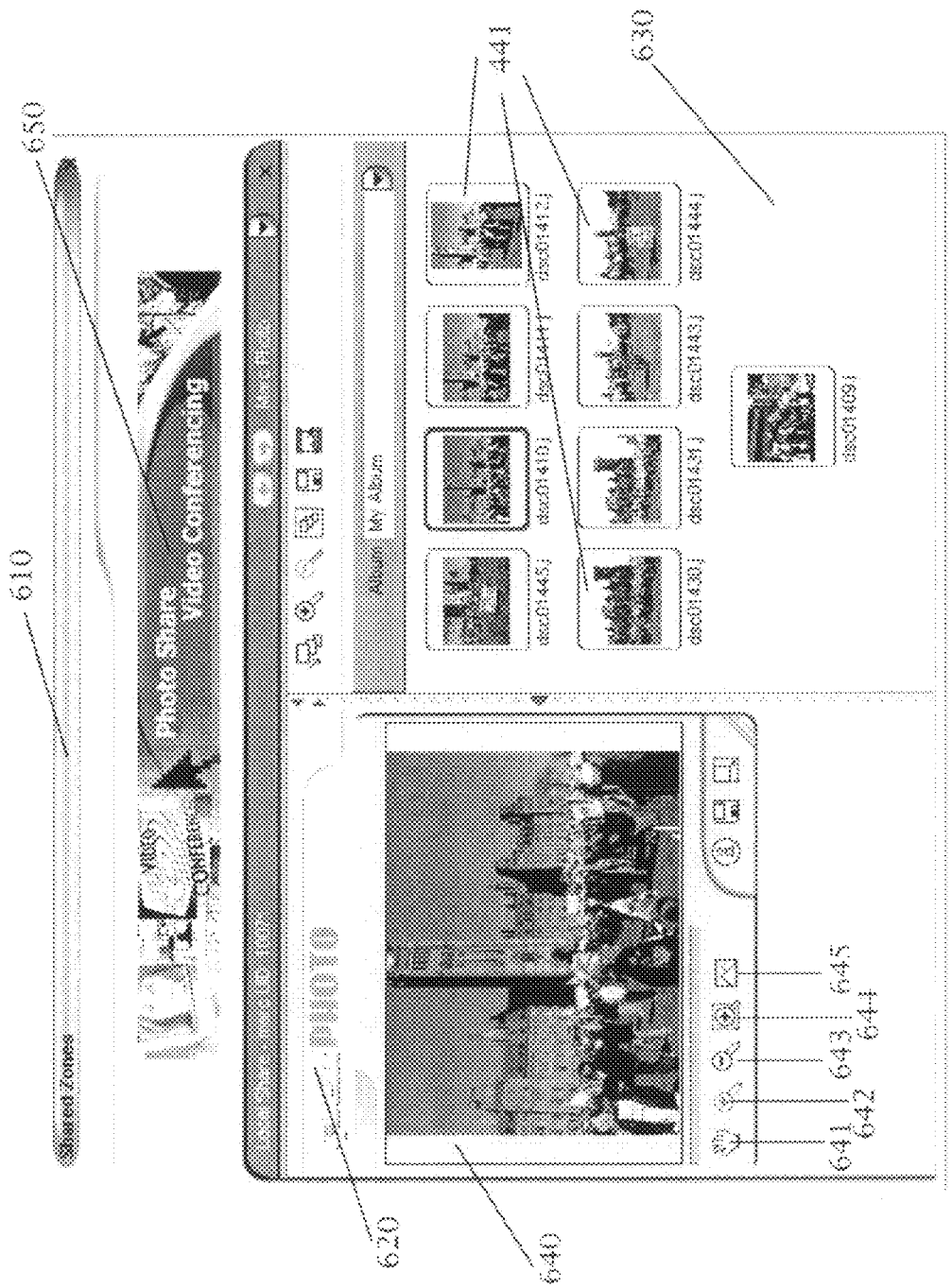
FIG. 6 is an illustration of a window displaying a zone being operated live by a user who has been granted access thereto, in accordance with a preferred embodiment of the present invention.

Reference is now made to FIG. 6, which is an illustration of a window 610 displaying zone 320 (FIG. 3) being operated live by a user who has been granted access thereto, in accordance with a preferred embodiment of the present invention. Window 610 includes a left pane 620 displaying peer-to-peer photo sharing service 330, and a right pane 630 displaying thumbnails 441 (FIG. 4) representing images within the shared photo album named "My Album."

As shown in FIG. 6, peer-to-peer photo sharing service 330 includes a viewer 640 for displaying selected images from the shared photo album. Preferably, a user drags and drops a thumbnail 441 from pane 630 into a display area of zone 320 within pane 620, in response to which viewer 640 displays the corresponding image. In accordance with a preferred embodiment of the preset invention, viewer 640 is an interactive viewer, including control buttons 641, 642, 643, 644 and 645 for panning, zooming in (i.e., enlarging), zooming out (i.e., reducing), zooming in on a rectangular portion, and resetting to an initial view, respectively. It may thus be appreciated that the present invention enables viewing of high resolution images, such as multi-megapixel images typical today of images captured by digital cameras and images scanned from photographs.

Figure 7:
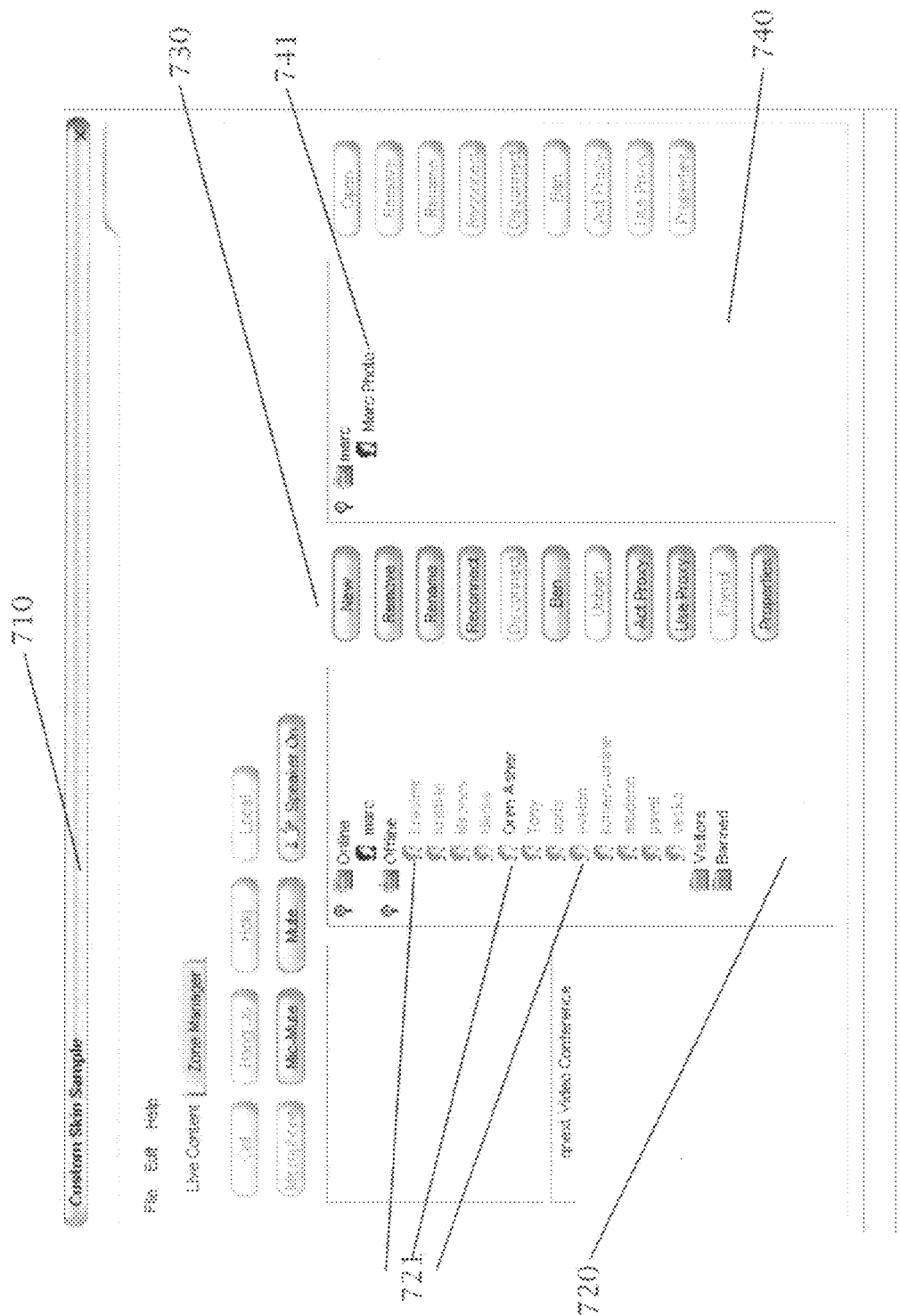
FIG. 7 is an illustration of a live content display interface, indicating to a user which of his friends are on-line, and which zones of theirs he may access, in accordance with a preferred embodiment of the present invention.

Reference is now made to FIG. 7, which is an illustration of a live content display interface, indicating to a user which of his friends are on-line, and which zones of theirs he may access, in accordance with a preferred embodiment of the present invention. Shown in FIG. 7 is a window 710 including a pane 720 for identifying users of the system of the present invention, designated generically by 721, for identifying friends of a user, and for notifying a user of other users that are currently on-line. Also shown in FIG. 7 are control buttons, designated generally by 730, for adding and removing friends. Also shown in FIG. 7 is a right pane 740 displaying a list of zones belonging to users of the system, such as peer-to-peer photo sharing zone 741, to which a user has access rights.

In reading the above description, persons skilled in the art will realize that there are many apparent variations that can be applied to the methods and systems described.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A peer-to-peer communication system, comprising:
   a re-direct server executing server software and including a database including a plurality of system users and for each of said plurality of system users, a corresponding user ID, password, and IP addresses for each corresponding user computer, wherein the re-direct server authenticates each of the plurality of system users using the stored user IDs and passwords, and based on the user being authenticated, enables the users to communicate directly with other users;

a plurality of user computers, including the corresponding user computers, interconnected with one another and the re-direct server via the Internet, each user computer executing peer-to-peer client software, wherein each of the plurality of user computers initially communicates with the re-direct server for authentication, wherein said peer-to-peer client software enables a given user to select a group of other system users of the plurality of system users, the selected group stored in a list of friends of the given user;

wherein with said peer-to-peer client software said given user arbitrarily defines a plurality of zones, each zone comprising one or more functionally different peer-to-peer communication services graphically laid out within a container window, wherein arbitrarily defining the plurality of zones comprises:

selecting, by the given user, a name for each of the plurality of zones, presenting to the given user a listing of a plurality of functionally different peer-to-peer services, the listing including interactive peer-to-peer services, selecting, by the given user, one or more functionally different peer-to-peer communication services from the presented listing of functionally different peer-to-peer services, wherein the user interfaces associated with the selected peer-to-peer services are graphically laid out within the container window representing each of the plurality of zones, and selecting, from the list of friends of the given user, one or more other users authorized to have access to each of the plurality of zones, wherein each of the selected name, selected peer-to-peer services, and authorized users are maintained as a definition for the zone, said peer-to-peer client software executed by each of said plurality of user computers is further configured to:

activate one or more defined zones, for which the corresponding user is authorized to access, concurrently by displaying the container window representing each of the one or more defined zones, for each activated zone, activating the one or more selected communication services corresponding to the activated zone, wherein the communication services enable the corresponding user to communicate with the given user and other users authorized to access to the activated zone, restrict access to each zone to the selected users authorized to have access to each zone, and maintain the definition of each zone, even when the zone is not active.

2. A peer-to-peer communication system according to claim 1, wherein the interactive peer-to-peer services includes at least one of: a group chat service, a video conference service, and a game service.

3. A peer-to-peer communication system according to claim 2, wherein said peer-to-peer client software enables the given user to set properties for each zone by pre-designating the data to be utilized by the at least one peer-to-peer service associated with the zone.

4. A peer-to-peer communication system according to claim 2, wherein using said peer-to-peer client software the given user edits zone definitions after a zone has been defined, including at least one of:

renaming the zone name and changing the friends of the given user entitled to access the zone.

5. A peer-to-peer communication system according to claim 2, wherein each peer-to-peer service is associated with a graphical user interface, and by using said peer-to-peer client software the given user to graphically lays out the peer-to-peer services within the container window.

6. A peer-to-peer communication system according to claim 2, wherein said peer-to-peer service includes a photo-sharing service which provides a user interface display for creating a digital photo album for sharing, including displaying image thumbnails within a directory selected in a directory browser and wherein a user drags thumbnails of images from several directories, dropping and displaying the thumbnails into a designated user photo album for sharing.

7. A peer-to-peer communication system according to claim 2, wherein using said peer-to-peer client software the given user opens a live content display interface, indicating to the given user which of said other peer-to-peer users are on-line and offline, and listing the zones of other online users the given user may access.

8. A method of building a peer-to-peer application in a peer-to-peer communication system, the peer-to-peer communication system comprising a server and a plurality of client computers interconnected via communications network, the method comprising:

registering each individual user of a plurality of users with the server;

storing, by the server, a user ID and password for each of the plurality of registered users;

selecting, by each individual user of the plurality of users, a group of one or more other users of the plurality of users, to be designated as friends, wherein the server maintains the list of users designated as friends for each of the plurality of users;

arbitrarily defining, by each individual user of the plurality of users, a plurality of zones, said arbitrarily defining comprising:

selecting, by the individual user, a name for each of the plurality of zones, presenting to the individual user a listing of a plurality of functionally different peer-to-peer services, the listing including interactive peer-to-peer services, selecting, by the individual user, one or more functionally different peer-to-peer communication services from the presented listing of functionally different peer-to-peer services, wherein the user interfaces associated with the selected peer-to-peer services are graphically laid out within the container window representing each of the plurality of zones, and selecting, from the list of friends of the individual user, one or more other users authorized to have access to each of the plurality of zones, wherein each of the selected name, selected peer-to-peer services, and authorized users are maintained as a definition for the zone, wherein each zone comprises one or more peer-to-peer services graphically laid out within a container window;

displaying, to each individual user of the plurality of users, via a live content display interface, a list of friends of the individual user who are on-line and a listing of each zone for which the individual user is authorized to have access;

concurrently activating, for each individual user of the plurality of users, one or more defined zones for which the individual user is authorized to access, by displaying the container window representing each of the one or more defined zones;

activating, for each activated defined zone, the one or more peer-to-peer communications services selected for the activated defined zone;

restricting access to each defined zone to the selected users authorized to have access to the defined zone; and maintaining the definition of each zone, even when the zone is not active.

9. A peer-to-peer communication method according to claim 8, wherein the peer-to-peer services includes a file exchange service, a photo sharing service, a video conference service, and a private e-mail service.

10. A peer-to-peer communication system according to claim 8, wherein the individual user sets properties for each zone by pre-designating the data to be utilized by the at least one peer-to-peer service associated with the zone.

11. A system according to claim 1, including an advertising server having an advertising banner database, and wherein the peer-to-peer client software streams advertising banners within its user interface display based on an ad banner URL, said ad banner URL being updated from time to time by the redirect server software, based on the advertising banner database.

12. A method according to claim 8, including streaming advertising banners to the client computers.

* * * * *